United States Patent
Hartwig et al.

(10) Patent No.: US 10,190,694 B2
(45) Date of Patent: Jan. 29, 2019

(54) FLOW CONTROL MOUNTING ASSEMBLY FOR A VALVE

(71) Applicant: Ross Operating Valve Company, Troy, MI (US)

(72) Inventors: Johannes Hartwig, Seeheim-Jugenheim (DE); An Vu Van, Pfungstadt (DE)

(73) Assignee: Ross Europa GmbH, Langen (DE)

( * ) Notice: Subject to any disclaimer, the term of this patent is extended or adjusted under 35 U.S.C. 154(b) by 122 days.

(21) Appl. No.: 15/129,573

(22) PCT Filed: Apr. 29, 2015

(86) PCT No.: PCT/US2015/028144
§ 371 (c)(1),
(2) Date: Sep. 27, 2016

(87) PCT Pub. No.: WO2016/175775
PCT Pub. Date: Nov. 3, 2016

(65) Prior Publication Data
US 2017/0175902 A1     Jun. 22, 2017

(51) Int. Cl.
*F16K 3/02* (2006.01)
*F16K 11/074* (2006.01)
*F15B 13/08* (2006.01)

(52) U.S. Cl.
CPC ............ *F16K 3/0254* (2013.01); *F15B 13/08* (2013.01); *F15B 13/081* (2013.01); *F16K 11/074* (2013.01); *F15B 13/0896* (2013.01); *Y10T 137/86574* (2015.04)

(58) Field of Classification Search
CPC .... F16K 3/0254; F16K 11/072–11/076; F15B 13/08; F15B 13/081; F15B 13/0896; Y10T 137/86574

USPC .................. 251/298–303; 137/625.2–625.64
See application file for complete search history.

(56) References Cited

U.S. PATENT DOCUMENTS

| 863,004 | A | * | 8/1907 | Smith | ........................ F16K 3/06 |
| | | | | | 137/625.45 |
| 2,742,919 | A | * | 4/1956 | Ray | ..................... F15B 13/0436 |
| | | | | | 137/330 |
| 3,016,918 | A | * | 1/1962 | Wentworth | ............. F16K 31/40 |
| | | | | | 137/596.15 |

(Continued)

FOREIGN PATENT DOCUMENTS

| EP | 0943813 A2 | 9/1999 |
| EP | 0893609 B1 | 2/2004 |

OTHER PUBLICATIONS

International Preliminary Report on Patentability for International Application No. PCT/US2015/028144 dated Sep. 12, 2017.

(Continued)

*Primary Examiner* — John Bastianelli
(74) *Attorney, Agent, or Firm* — Carlson, Gaskey & Olds, P.C.

(57) ABSTRACT

A valve mounting system includes an upper plate including an upper inlet, an upper outlet, and an upper exhaust. A lower plate includes a lower inlet, a lower outlet, and a lower exhaust that are aligned with the upper inlet, the upper outlet, and the upper exhaust, respectively to define an inlet, an outlet and an exhaust, respectively. A spoon moves about an axis to control a flow of fluid through an opening. The opening is one of the inlet, the outlet and the exhaust.

17 Claims, 4 Drawing Sheets

(56) References Cited

U.S. PATENT DOCUMENTS

| | | | | |
|---|---|---|---|---|
| 3,741,237 A | * | 6/1973 | Browne | F15B 13/0402 |
| | | | | 137/332 |
| 3,837,356 A | * | 9/1974 | Selep | F16K 3/312 |
| | | | | 137/375 |
| 4,046,061 A | * | 9/1977 | Stokes | F15C 3/14 |
| | | | | 137/625.45 |
| 4,071,047 A | * | 1/1978 | Greene | F16K 11/0655 |
| | | | | 137/625.18 |
| 4,545,563 A | * | 10/1985 | Morioka | F16K 31/0624 |
| | | | | 137/625.2 |
| 4,930,401 A | * | 6/1990 | Cameron | F15B 18/00 |
| | | | | 137/863 |
| 4,986,308 A | * | 1/1991 | Champseaux | F16K 7/16 |
| | | | | 137/625.44 |
| 6,161,586 A | * | 12/2000 | Hirata | F15B 11/16 |
| | | | | 137/112 |
| 2003/0029510 A1 | | 2/2003 | Miyazoe et al. | |
| 2012/0223264 A1 | * | 9/2012 | Doerr | F16K 31/0682 |
| | | | | 251/129.15 |

OTHER PUBLICATIONS

International Search Report and Written Opinion for PCT Application No. PCT/US2015/028144 dated Jan. 25, 2016.

\* cited by examiner

FLOW CONTROL MOUNTING ASSEMBLY FOR A VALVE

BACKGROUND OF THE INVENTION

A valve includes a solenoid. Air flows through an inlet, an outlet and an exhaust of the valve. It is beneficial to control the air flowing through the inlet. Prior valves employ a check valve and steel balls, which can be a complex arrangement.

SUMMARY OF THE INVENTION

In one exemplary embodiment, a valve mounting system includes an upper plate including an upper inlet, an upper outlet, and an upper exhaust. A lower plate includes a lower inlet, a lower outlet, and a lower exhaust that are aligned with the upper inlet, the upper outlet, and the upper exhaust, respectively to define an inlet, an outlet and an exhaust, respectively. A spoon moves about an axis to control a flow of fluid through an opening. The opening is one of the inlet, the outlet and the exhaust.

In a further embodiment of the above, the spoon controls the flow of fluid through the inlet.

In a further embodiment of any of the above, the spoon is located between the upper plate and the lower plate.

In a further embodiment of any of the above, when the spoon is in a first position and located away from the opening, the fluid flow is unrestricted through the opening, and when the spoon is in a second position with at least a portion of the spoon located in the opening, the fluid flow is restricted by the spoon.

In a further embodiment of any of the above, the spoon is located in any position between the first position and the second position to partially restrict the fluid flow, and an amount of restriction of the fluid flow increases as the spoon moves from the first position to the second position.

In a further embodiment of any of the above, a lever assembly moves the spoon, the lever assembly includes a wedge shaped lever including a post, and the post extends through a portion of the spoon to connect the lever to the spoon.

In a further embodiment of any of the above, a resilient member biases the lever to bias the spoon connected to the lever to the first position.

In a further embodiment of any of the above, a flow control mechanism actuated the lever assembly to move the lever to move the spoon to control the fluid flow through the opening, and the flow control opening includes a plate and a threaded fastener received in an aperture in the plate.

In a further embodiment of any of the above, a bottom of the threaded fastener is substantially cone shaped and engages the lever at a location of engagement, and as the threaded fastener is turned in one direction, a diameter of the bottom of the threaded portion at the location of engagement increases to move the spoon from the first position to the second position, and as the threaded fastener is turned in an opposition direction, the diameter of the bottom of the threaded portion at the location of engagement decreases to move the spoon from the second position to the first position.

In another exemplary embodiment, a valve assembly includes a base structure, a plurality of valves, and a valve mounting assembly that is located between the plurality of valves and the base structure. The valve mounting system includes an upper plate including an upper inlet, an upper outlet, and an upper exhaust, a lower plate including a lower inlet, a lower outlet, and a lower exhaust that are aligned with the upper inlet, the upper outlet, and the upper exhaust, respectively to define an inlet, an outlet and an exhaust, respectively, and a spoon that moves about an axis to control a flow of fluid through an opening. The opening is one of the inlet, the outlet and the exhaust.

In a further embodiment of the above, the spoon controls the flow of fluid through the inlet.

In a further embodiment of any of the above, the spoon is located between the upper plate and the lower plate.

In a further embodiment of any of the above, when the spoon is in a first position and located away from the opening, the fluid flow is unrestricted through the opening, and when the spoon is in a second position with at least a portion of the spoon located in the opening, the fluid flow is restricted by the spoon.

In a further embodiment of any of the above, the spoon is located in any position between the first position and the second position to partially restrict the fluid flow, and an amount of restriction of the fluid flow increases as the spoon moves from the first position to the second position.

In a further embodiment of any of the above, a lever assembly moves the spoon. The lever assembly includes a wedge shaped lever including a post. The post extends through a portion of the spoon to connect the lever to the spoon.

In a further embodiment of any of the above, a resilient member biases the lever to bias the spoon connected to the lever to the first position.

In a further embodiment of any of the above, a flow control mechanism actuated the lever assembly to move the lever to move the spoon to control the fluid flow through the opening, and the flow control opening includes a plate and a threaded fastener received in an aperture in the plate.

In a further embodiment of any of the above, a bottom of the threaded fastener is substantially cone shaped and engages the lever at a location of engagement, and as the threaded fastener is turned in one direction, a diameter of the bottom of the threaded portion at the location of engagement increases to move the spoon from the first position to the second position, and as the threaded fastener is turned in an opposition direction, the diameter of the bottom of the threaded portion at the location of engagement decreases to move the spoon from the second position to the first position.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
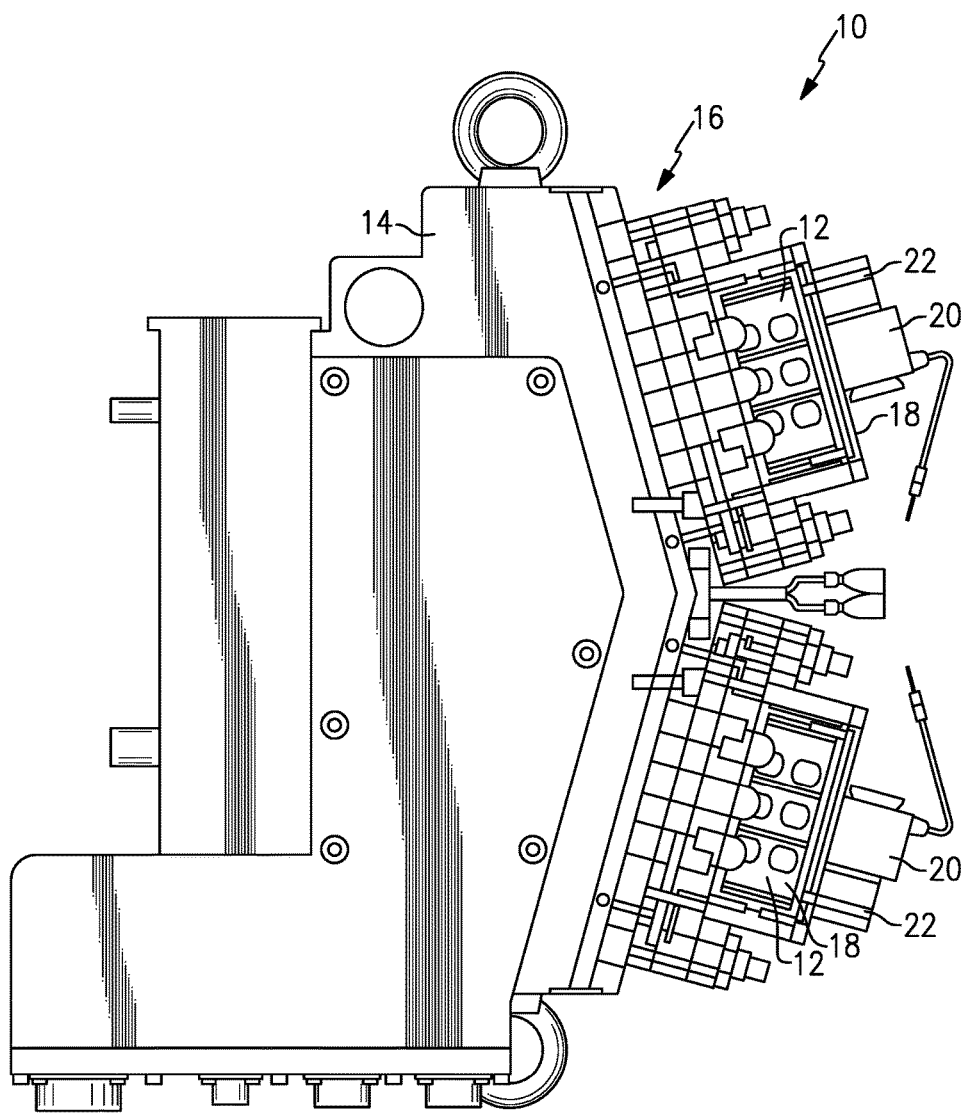
FIG. 1 illustrates a valve assembly.
Figure 2:
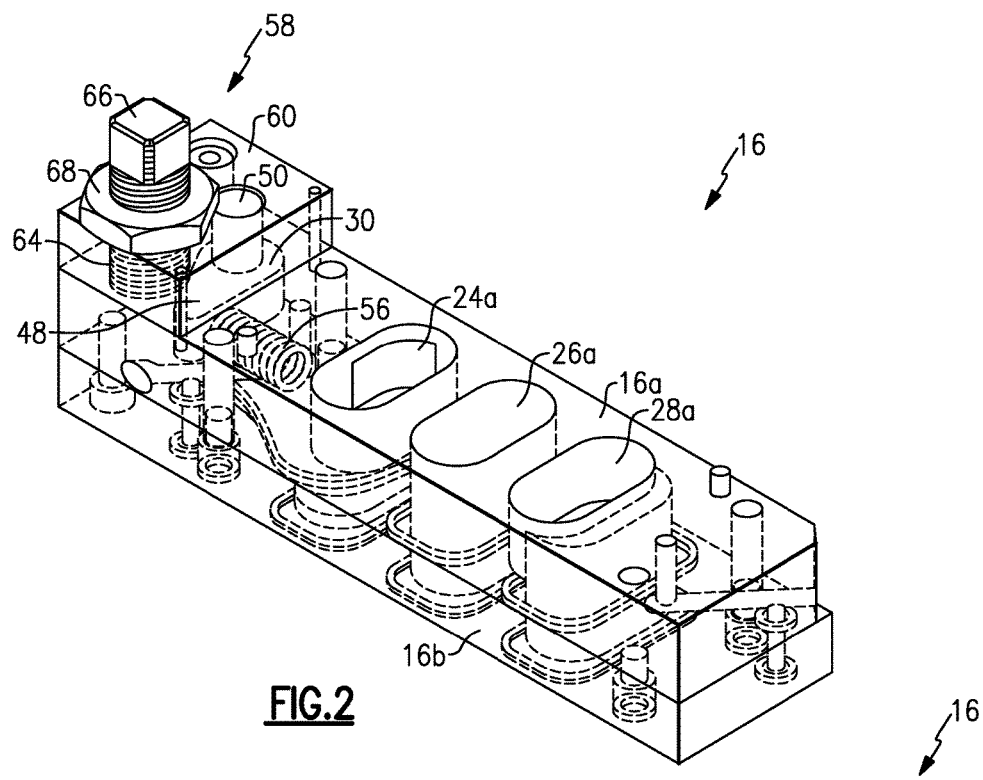
FIG. 2 illustrates a perspective top view of a mounting assembly.
Figure 3:
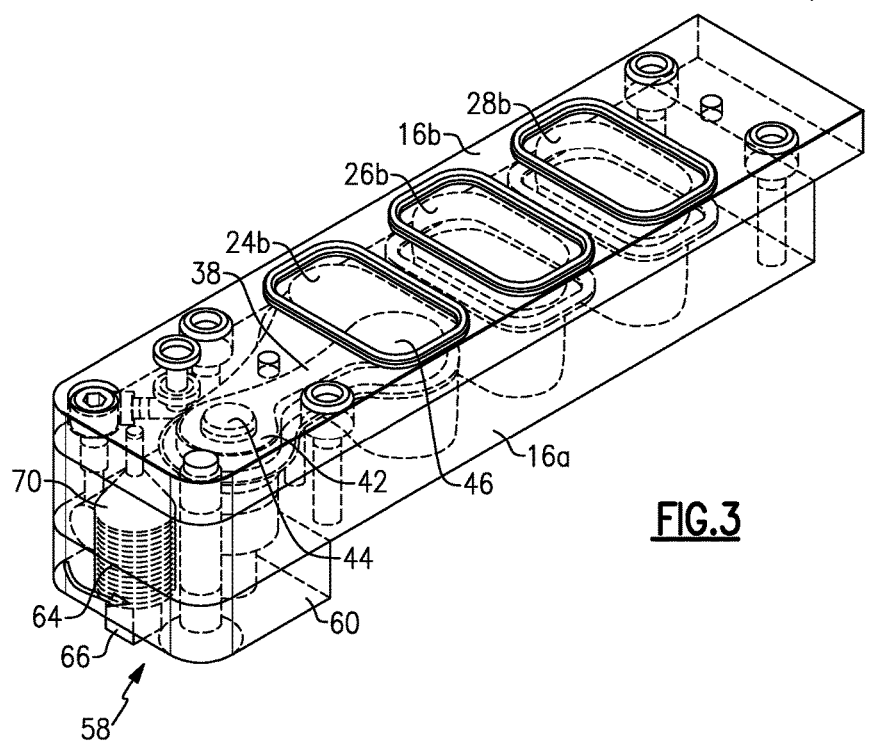
FIG. 3 illustrates a perspective bottom view of the mounting assembly.

FIG. 1 illustrates a valve assembly 10 including a plurality of valves 12 mounted on a base structure 14. A mounting assembly 16 is located between the plurality of valves 12 and the base structure 14. A cartridge 18 is located in each of the valves 12 to control a flow of a fluid through the valves 12. In one example, the fluid is air. A solenoid 20 and a magnet 22 are located on the valve 12 to control movement of the cartridge 18 to control the flow of fluid through the valve 12.

As shown in FIG. 1, the valves 12 can be mounted in either direction on the mounting assembly 16 (that is, reversed 180°). In one orientation as described below, fluid through an inlet 24 is controlled. If the mounting assembly 16 is mounted reversed, the working fluid through the outlet 26 or through the exhaust 28 can be controlled. This provides better access for the worker. That is, although an inlet 24 is described below, the flow of fluid through the outlet 26 or the exhaust 28 can be controlled.

Figure 4:
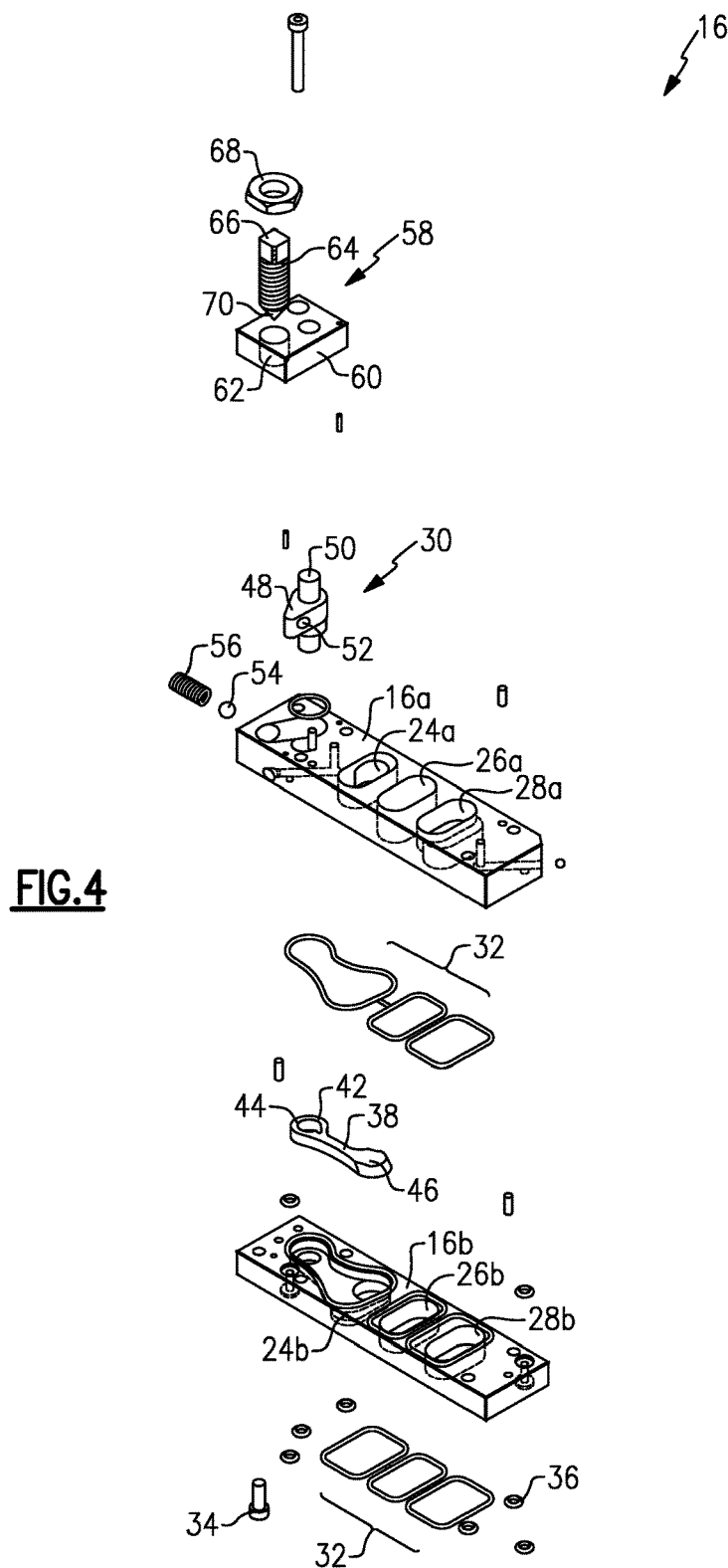
FIG. 4 illustrates an exploded view of the mounting assembly.
Figure 5:
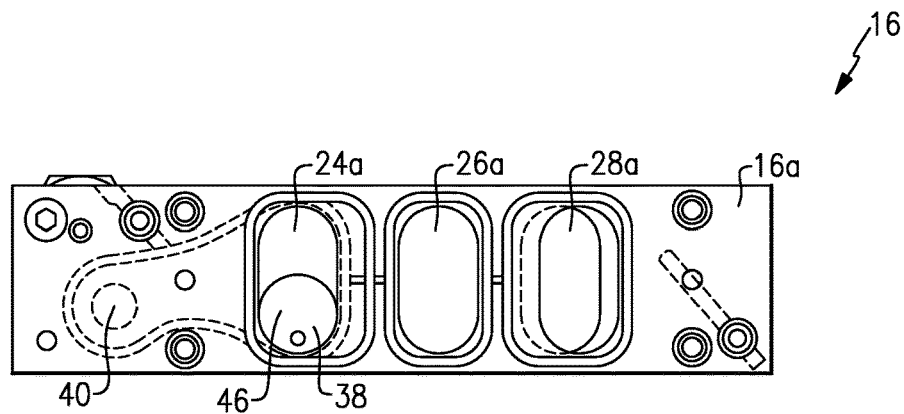
FIG. 5 illustrates a top view of the mounting assembly.
Figure 6:
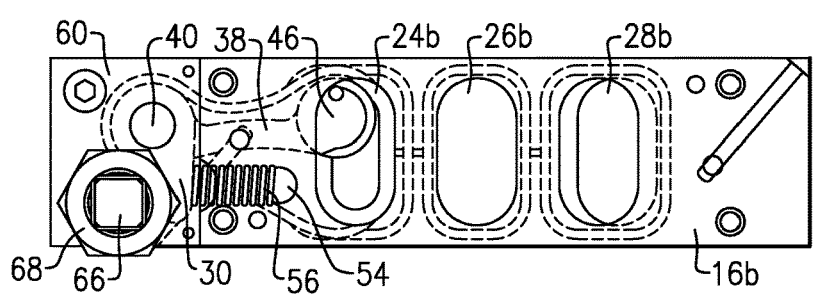
FIG. 6 illustrates a cross-sectional top view of the mounting assembly.
Figure 7:
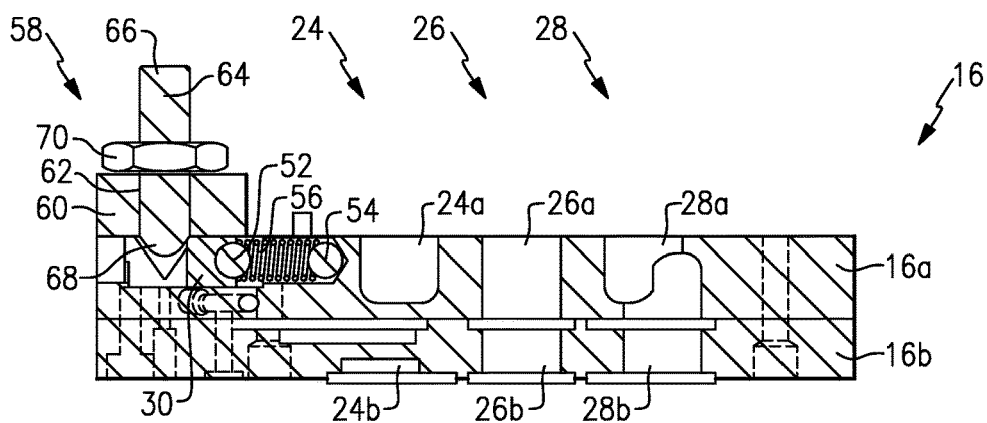
FIG. 7 illustrates a cross sectional side view of the mounting assembly.

As shown in FIGS. 2 to 7, the mounting assembly 16 includes an upper plate 16a and a lower plate 16b each including aligned inlets 24a and 24b, aligned outlets 26a and 26b, and aligned exhausts 28a and 28b that define an inlet 24, and outlet 26 and an exhaust 28, respectively (shown in FIG. 7). During a working condition, the fluid enters the valve 12 through the inlet 24 and is directed to a workpiece (not shown) through the outlet 26. When the valve 12 is not in a working condition, the fluid flows through the inlet 24 and to the exhaust 28. As shown in FIG. 4, seals 32 are located around the inlets 24a and 24b, the outlets 26a and 26b, and the exhausts 28a and 28b. The upper plate 16a and lower plate 16b are connected by a variety of fasteners 34 and seals 36 to prevent leakage.

Each valve 12 includes a spoon 38 that moves about an axis 40 to control flow of the fluid through the inlet 24. When the spoon 38 is positioned away from the inlet 24, the fluid flows freely through the inlet 24. When the spoon 38 is positioned in the passages of the inlet 24, the spoon 38 can block or reduce the flow of the fluid. When the spoon 38 is in a first position and located away from the inlet 24, the fluid flow is unrestricted through the inlet 24. When the spoon 38 is in a second position located near the inlet 24, the fluid flow is restricted or blocked by the spoon 38. The spoon 38 can be located in any position between the first position and the second position to partially restrict the fluid flow through the inlet 24, and an amount of restriction of the fluid flow through the inlet 24 increases as the spoon 38 moves from the first position to the second position.

The spoon 38 is located between the upper plate 16a and the lower plate 16b. The spoon 38 includes a fastening component 42 with an aperture 44 and a covering portion 46. A lever assembly 30 moves the spoon 38. The lever assembly 30 includes a wedge or pie shaped lever 48 and a post 50 that extends through the lever 48. The post 50 extends through the aperture 44 of the fastening component 42 of the spoon 38. A ball 52 is secured in a portion of the lever 48. A resilient member 56, such as a spring, is located between the ball 52 and a second ball 54 to bias the spoon 38 to the first position.

A flow control mechanism 58 moves the spoon 38 to control the flow of the fluid through the inlet 24. The flow control mechanism 58 includes a plate 60 including an aperture 62, and a threaded fastener 64 is received in the aperture 62. In one example, an upper end of the threaded fastener 64 includes a square shaped nut 66, and a lower end of the threaded fastener 64 includes a cone shaped feature 70. The threaded fastener 64 is received in an internally threaded nut 68 that secures the threaded fastener 64 to the plate 60 and reduces vibrations. A special tool (not shown) is used to engage the square shaped nut 66 and move the threaded fastener 64 and therefore the lever 48 and the spoon 38 and control the flow of fluid through the inlet 24.

When the spoon 38 is in the first position, the covering portion 46 is positioned away from the inlet 24. When the flow of the fluid through the inlet 24 needs to be controlled and reduced or eliminated, the square shaped nut 66 is moved by the special tool to move the threaded fastener 64 with the cone shaped feature 70 downwardly to engage the lever 48 to cause the lever 48 to rotate about the axis 40. As the threaded fastener 64 is turned in one direction and moves downwardly, the cone shaped feature 70 also moves downwardly, and the increase in diameter of the cone shaped feature 70 at a location of engagement with the lever 48 causes the lever 48 to move from the first position to the second position. As the lever 48 moves, the resilient member 56 compresses between the balls 52 and 54, and the covering portion 46 of the spoon 38 pivots to the second position to cover a portion or all of the inlet 24. That is, as the square shaped nut 66 is rotated, the spoon 38 rotates about the axis 40 to the second position to reduce the fluid flow.

When the spoon 38 is in the second position, the covering portion 46 is positioned to cover a portion or all of the inlet 24. When the flow of the fluid through the inlet 24 needs to be controlled or increased, the square shaped nut 66 is moved by the special tool to move the threaded fastener 64 with the cone shaped feature 70 upwardly to engage the lever 48 to cause the lever 48 to rotate about the axis 40. As the threaded fastener 64 is turned in an opposing direction and moves upwardly, the cone shaped feature 70 also moves upwardly, and the decrease in diameter of the cone shaped feature 70 at a location of engagement with the lever 48 causes the lever 48 to move from the second position to the first position. As the lever 48 moves, the resilient member 56 expands between the balls 52 and 54, and the covering portion 46 of the spoon 38 pivots to the first position away from the inlet 24. That is, as the square shaped nut 66 is rotated, the spoon 38 rotates about the axis 40 to the first position to increase the fluid flow.

The mounting assembly 16 allows for a high precision adjustment of the fluid flow. The mounting assembly 16 also allows for a higher airflow than the prior art which employs check valves.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve mounting system comprising:
an upper plate including an upper inlet, an upper outlet, and an upper exhaust;

a lower plate including a lower inlet, a lower outlet, and a lower exhaust that are aligned with the upper inlet, the upper outlet, and the upper exhaust, respectively to define an inlet, an outlet and an exhaust, respectively;

a spoon that pivots about an axis to control a flow of fluid through an opening, wherein the opening is one of the inlet, the outlet and the exhaust, wherein the spoon is located between the upper plate and the lower plate, the upper plate is located above the spoon, and the lower plate is located below the spoon.

2. The valve mounting system as recited in claim 1 wherein the spoon controls the flow of fluid through the inlet.

3. The valve mounting system as recited in claim 1 wherein when the spoon is in a first position and located away from the opening, the fluid flow is unrestricted through the opening, and when the spoon is in a second position with at least a portion of the spoon located in the opening, the fluid flow is restricted by the spoon.

4. The valve mounting system as recited in claim 3 wherein the spoon is located in any position between the first position and the second position to partially restrict the fluid flow, and an amount of restriction of the fluid flow increases as the spoon moves from the first position to the second position.

5. A valve mounting system comprising:
an upper plate including an upper inlet, an upper outlet, and an upper exhaust;
a lower plate including a lower inlet, a lower outlet, and a lower exhaust that are aligned with the upper inlet, the upper outlet, and the upper exhaust, respectively to define an inlet, an outlet and an exhaust, respectively;
a spoon that moves about an axis to control a flow of fluid through an opening, wherein the opening is one of the inlet, the outlet and the exhaust, wherein when the spoon is in a first position and located away from the opening, the fluid flow is unrestricted through the opening, and when the spoon is in a second position with at least a portion of the spoon located in the opening, the fluid flow is restricted by the spoon, and wherein the spoon is located in any position between the first position and the second position to partially restrict the fluid flow, and an amount of restriction of the fluid flow increases as the spoon moves from the first position to the second position; and
a lever assembly that moves the spoon, the lever assembly includes a wedge shaped lever including a post, wherein the post extends through a portion of the spoon to connect the lever to the spoon.

6. The valve mounting system as recited in claim 5 wherein a resilient member biases the lever to bias the spoon connected to the lever to the first position.

7. The valve mounting system as recited in claim 6 wherein a flow control mechanism actuates the lever assembly to move the lever to move the spoon to control the fluid flow through the opening, and the flow control opening includes a plate and a threaded fastener received in an aperture in the plate.

8. The valve mounting system as recited in claim 7 wherein a bottom of the threaded fastener is substantially cone shaped and engages the lever at a location of engagement, and as the threaded fastener is turned in one direction, a diameter of the bottom of the threaded portion at the location of engagement increases to move the spoon from the first position to the second position, and as the threaded fastener is turned in an opposition direction, the diameter of the bottom of the threaded portion at the location of engagement decreases to move the spoon from the second position to the first position.

9. A valve assembly comprising:
a base structure;
a plurality of valves; and
a valve mounting assembly that is located between the plurality of valves and the base structure, wherein the valve mounting system including an upper plate including an upper inlet, an upper outlet, and an upper exhaust, a lower plate including a lower inlet, a lower outlet, and a lower exhaust that are aligned with the upper inlet, the upper outlet, and the upper exhaust, respectively to define an inlet, an outlet and an exhaust, respectively, and a spoon that pivots about an axis to control a flow of fluid through an opening, wherein the opening is one of the inlet, the outlet and the exhaust, wherein the spoon is located between the upper plate and the lower plate, an upper plate is located above the spoon, and the lower plate is located below the spoon.

10. The valve assembly as recited in claim 9 wherein the spoon controls the flow of fluid through the inlet.

11. The valve assembly as recited in claim 9 wherein when the spoon is in a first position and located away from the opening, the fluid flow is unrestricted through the opening, and when the spoon is in a second position with at least a portion of the spoon located in the opening, the fluid flow is restricted by the spoon.

12. The valve assembly as recited in claim 11 wherein the spoon is located in any position between the first position and the second position to partially restrict the fluid flow, and an amount of restriction of the fluid flow increases as the spoon moves from the first position to the second position.

13. The valve assembly as recited in claim 12 including a lever assembly that moves the spoon, the lever assembly includes a wedge shaped lever including a post, wherein the post extends through a portion of the spoon to connect the lever to the spoon.

14. A valve assembly comprising:
a base structure;
a plurality of valves;
a valve mounting assembly that is located between the plurality of valves and the base structure, wherein the valve mounting system including an upper plate including an upper inlet, an upper outlet, and an upper exhaust, a lower plate including a lower inlet, a lower outlet, and a lower exhaust that are aligned with the upper inlet, the upper outlet, and the upper exhaust, respectively to define an inlet, an outlet and an exhaust, respectively, and a spoon that moves about an axis to control a flow of fluid through an opening, wherein the opening is one of the inlet, the outlet and the exhaust, wherein when the spoon is in a first position and located away from the opening, the fluid flow is unrestricted through the opening, and when the spoon is in a second position with at least a portion of the spoon located in the opening, the fluid flow is restricted by the spoon, and wherein the spoon is located in any position between the first position and the second position to partially restrict the fluid flow, and an amount of restriction of the fluid flow increases as the spoon moves from the first position to the second position;
a lever assembly that moves the spoon, the lever assembly includes a wedge shaped lever including a post, wherein the post extends through a portion of the spoon to connect the lever to the spoon; and a resilient member biases the lever to bias the spoon connected to the lever to the first position.

15. The valve assembly as recited in claim 14 wherein a flow control mechanism actuates the lever assembly to move the lever to move the spoon to control the fluid flow through the opening, and the flow control opening includes a plate and a threaded fastener received in an aperture in the plate.

16. The valve assembly as recited in claim 15 wherein a bottom of the threaded fastener is substantially cone shaped and engages the lever at a location of engagement, and as the threaded fastener is turned in one direction, a diameter of the bottom of the threaded portion at the location of engagement increases to move the spoon from the first position to the second position, and as the threaded fastener is turned in an opposition direction, the diameter of the bottom of the threaded portion at the location of engagement decreases to move the spoon from the second position to the first position.

17. A valve mounting system comprising:
- an upper plate including an upper inlet, an upper outlet, and an upper exhaust;
- a lower plate including a lower inlet, a lower outlet, and a lower exhaust that are aligned with the upper inlet, the upper outlet, and the upper exhaust, respectively to define an inlet, an outlet and an exhaust, respectively;
- a spoon that moves about an axis to control a flow of fluid through an opening, wherein the opening is one of the inlet, the outlet and the exhaust; and
- a lever assembly that moves the spoon, wherein the lever assembly includes a wedge shaped lever including a post, and the post extends through a portion of the spoon to connect the lever to the spoon.

\* \* \* \* \*